Figure 1:
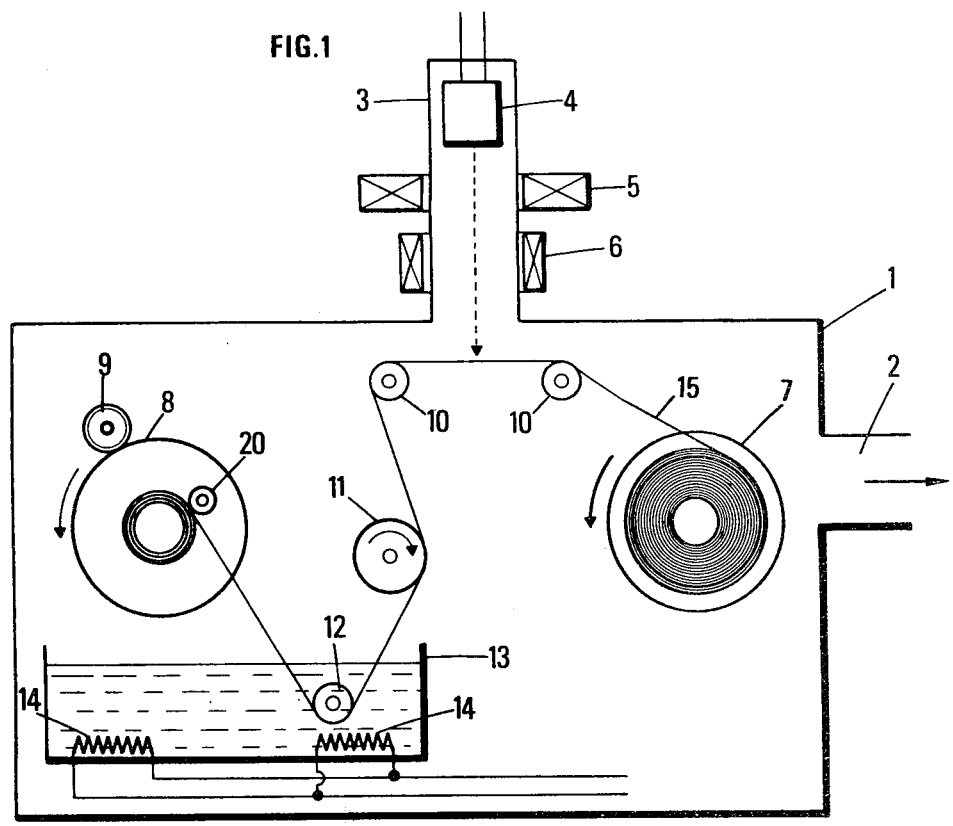

United States Patent [19]

Dubois et al.

[11] 4,261,287

[45] Apr. 14, 1981

[54] METHOD FOR MANUFACTURING SENSITIVE ELEMENTS HAVING A PERMANENT ELECTRIC POLARIZATION AND DEVICE FOR PERFORMING THE SAME

[75] Inventors: Jean-Claude Dubois, Royan; Alain Delaunay, Lugon, both of France

[73] Assignee: Institut Francais du Petrole, Rueil-Malmaison, France

[21] Appl. No.: 44,306

[22] Filed: May 31, 1979

Related U.S. Application Data

[62] Division of Ser. No. 812,860, Jul. 5, 1977, Pat. No. 4,173,659.

[30] Foreign Application Priority Data

Jul. 5, 1976 [FR] France ............................ 76 20698

[51] Int. Cl.³ .......................................... B05D 3/06
[52] U.S. Cl. .................................. 118/620; 264/22; 427/35
[58] Field of Search ................. 118/620; 427/35; 156/272; 264/22; 204/164, 193

[56] References Cited

U.S. PATENT DOCUMENTS

| | | | |
|---|---|---|---|
| 2,989,633 | 6/1961 | Wilson | 427/44 |
| 3,081,485 | 3/1963 | Steigerwald | 118/620 |
| 3,501,390 | 3/1970 | Turner | 427/44 |
| 3,565,780 | 2/1971 | Zimmerman | 427/44 |
| 3,846,521 | 11/1974 | Osterholtz | 264/22 |
| 3,930,066 | 12/1975 | Ryan et al. | 427/35 |

Primary Examiner—John H. Newsome
Attorney, Agent, or Firm—Craig and Antonelli

[57] ABSTRACT

The permanent electric polarization is imparted to the sensitive element by electronic bombardment within an enclosure wherein prevails a rarefied atmosphere and in which said bombardment is followed with a coating of the so-polarized sensitive element with a film of liquid of very low saturating vapor pressure whose dielectric strength is higher than that of the rarefied air of the enclosure and having advantageously lubricating properties.

9 Claims, 5 Drawing Figures

METHOD FOR MANUFACTURING SENSITIVE ELEMENTS HAVING A PERMANENT ELECTRIC POLARIZATION AND DEVICE FOR PERFORMING THE SAME

This is a division of application Ser. No. 812,860, filed July 5, 1977 now U.S. Pat. No. 4,173,659.

This invention relates to a method for manufacturing sensitive elements having a permanent electric polarization and to a device for carrying out this method.

The sensitive element is made of a material of the "electret" type obtained for example by polarizing a strip of a thickness from 8 to 25 microns, made of dielectric plastic metarial of such a type as polypropylene, polytetrafluoroethylene, polyethylene terephtalate, etc. . . . This polarization can be effected for example by bombardment of the dielectric strip with an electron beam of sufficient energy level. The strip as well as the electron gun is usually placed within an enclosure in which a high vacuum has been effected.

When a normal pressure is progressively restored in the enclosure after the polarization operations, the dielectric strength first decreases according to the Paschen law, passes to a minimum value for a pressure of a few Torrs and then, regularly increases until the pressure attains the atmospheric pressure value. The charges accumulated in the electret strip produce a high electric field which ionizes the air particularly when the pressure attains the value corresponding to the minimum value of the dielectric strength. The ionization of the rarefied atmosphere surrounding the strip tends to depolarize it.

A known method for passing from ultra-vacuum to a normal pressure consists of producing a very quick pressure change so as to limit the duration of the ionization phenomena and accordingly, the degradation of the electric charge accumulated in the treated strips. This known method suffers from the drawback that the obtained results are often heterogeneous.

Known methods for making in a continuous manner sensitive elements to which is imparted a permanent electric polarization, comprise also the winding of the polarized strips on a drum. When the strip is wound dry, the turns cannot shift laterally with respect to one another as a result of the strong adhesive power of the electrets. This results in a bad setting of the strip, further disturbed by numerous folds.

The method of the invention has for object to avoid the above-mentioned drawbacks.

It consists first to place the element to be polarized in an enclosure containing a rarefied atmosphere and imparting thereto a permanent electric polarization by electronic bombardment. The element is then contacted, inside the enclosure, with a liquid of very low saturating vapor pressure whose dielectric strength is higher than that of the rarefied air.

At the moment where a normal pressure is restored in the enclosure, the polarized element is in contact with an electrically rigid liquid which protects it against both ionization phenomena and degradation of the electric charge. Thus, the passage of the highly charged electrets from ultra-vacuum to the normal pressure may be conducted without noticeable damage.

Another characteristic of the invention consists in the fact that the liquid exhibits lubricating properties. The presence of lubricating liquid on the sensitized element makes possible a winding without folds and a good setting of the turns over the take-up reels. The capacity of the latter may thus be used more completely.

Figure 2:
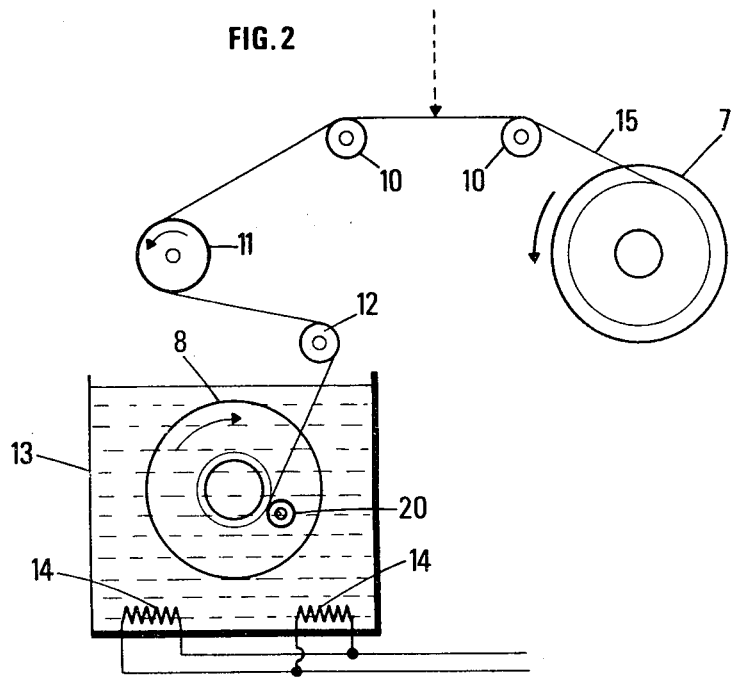
Figure 3:
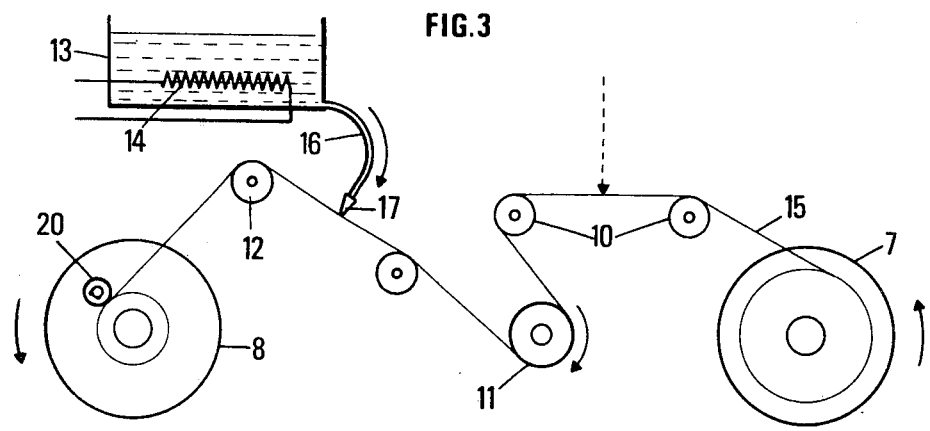
Figure 4:
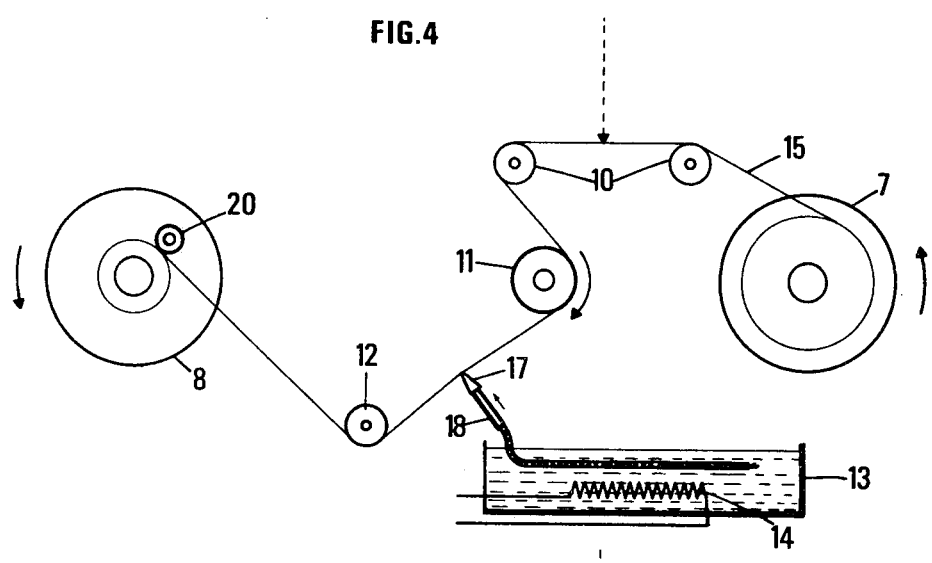
Figure 5:
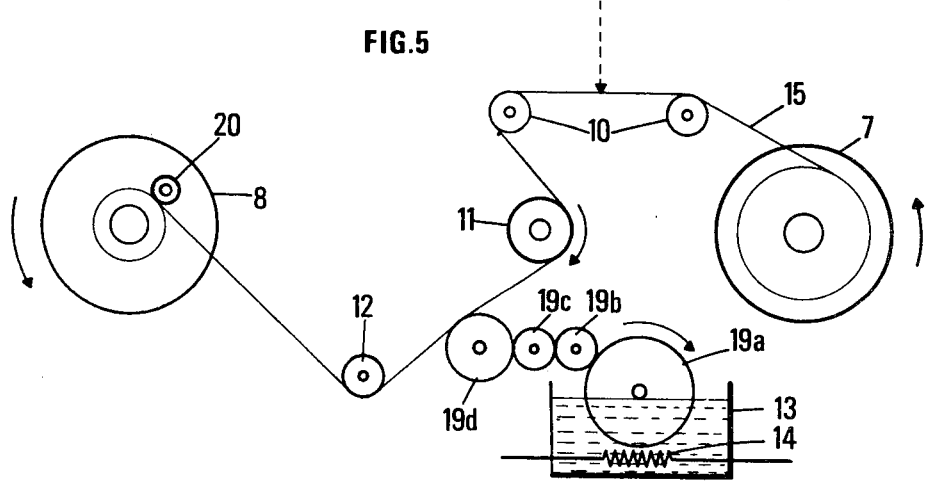

Other advantages of the method as well as characteristics of the device for performing the same will be made apparent from the following description of non limitative embodiments given with reference to the accompanying drawings wherein:

FIG. 1 shows a first embodiment of the device;
FIG. 2 shows a second embodiment of the device;
FIG. 3 shows a first variant of the first embodiment;
FIG. 4 shows a second variant of the first embodiment, and
FIG. 5 shows a third variant of the first embodiment.

The device shown in FIG. 1 comprises a tight enclosure 1 communicating through an opening 2 with a vacuum pump of a known type, not shown. The enclosure comprises a tubular portion 3 in which is placed an electron gun 4. A focusing system 5 provides for the concentration of the electron beam in a plane where is placed the element to be sensitized. A system of deflecting coils 6 controls the deflection of the beam according to a predetermined deflection law.

The strip to be sensitized is wound up on a delivering reel 7. It is transferred to a take-up reel 8, driven in rotation by a friction roller 9, after passage over two rollers 10 arranged in such a manner that the strip is displaced perpendicularly to the electron beam and in the focusing plane thereof.

The strip passes over a driving capstan 11 which determines the unwinding speed and then over a roller 12 maintained immersed in a vessel or tank 13 containing a coating fluid, consisting for example of a special oil for ultra-vacuum operations, whose saturating vapor pressure is very low and whose dielectric strength is smaller that that of the rarefied air. There is used preferably a silicone oil whose vapor pressure is $10^{-7}$ torr. More generally, it is convenient to make use of a liquid whose vapor pressure is at most equal to $5.10^{-7}$ torr.

A heating system, comprising for example electric resistors 14, is immersed in the tank 13. The strip is wound up on the take-up reel 8, after immersion in oil. A metallic pressing roller 20 is arranged near the point of application of the strip on the take-up reel 8. By experience, it has been observed that this pressing roller is very useful for improving the setting of the turns over one another.

Before the step of sensitizing the strip, a preliminary step is conducted during which the coating fluid is fed to the tank and a very high vacuum is established in enclosure 1. The fluid is heated so as to remove gas therefrom, at a temperature of about 60° C., for example until the residual pressure in the enclosure becomes lower than $10^{-6}$ Torr. The fluid is then allowed to cool down and the strip-driving system is actuated. If a pressure increase above $10^{-6}$ Torr is observed in the enclosure, the unwinding of the strip is discontinued until a new gas removing cycle has been performed.

When the gas removal is sufficient, i.e. when no pressure increase is observed after the starting of the unwinding operation, the strip to be polarized is subjected to the electronic bombardment.

When a sufficient amount of the strip has been sensitized, the inside of the enclosure is progressively put in communication with the external medium at atmospheric pressure and the take-up reel is disengaged and taken off from the enclosure. The transition time between rarefied atmosphere and the external pressure is not critical and does not result in a substantial depolarization of the sensitized strip.

According to the embodiment of FIG. 2, the take-up reel 8 is immersed at least partly in a tank containing the lubricating coating fluid.

The variants of the first embodiment illustrated in FIGS. 3 to 5, concern three different systems for coating the sensitized strip 15 before its winding up on the take-up reel. According to the first variant the tank 13 containing the lubricating fluid is place above the strip 15. The fluid is conveyed through pipe 16 from the tank 13 to a pad 17, for example of felt, in frictional engagement with the strip 15.

According to a second variant, the tank 13 is placed below the strip 15 and the friction pad 17 is fed by capillarity through a wick 18.

According to the third variant, the sensitized element 15 is coated with lubricating fluid by contact with a roller 19d. The oil is transferred to the latter by a roller 19a dipped into the fluid of the tank, through two intermediary rollers 19b and 19c with which there are in contact.

What we claim is:

1. A device for manufacturing a sensitive element having a permanent electric polarization comprising a tight enclosure containing a plastic element and intermittently communicating with the pumping system for providing a rarefied atmosphere within the enclosure, means for imparting to the element a permanent electric polarization and means for supporting the element within the enclosure, the device also comprising means for depositing on the element, after polarization, a film of lubricating liquid of very low saturated vapor pressure whose dielectric strength is higher than that of rarefied air, contained in the vessel within the enclosure and the vessel including means for heating the liquid contained therein.

2. A device according to claim 1, wherein said element is a strip of plastic substrate and the support means comprises a driving system for unwinding the strip in front of said polarization means between a delivering reel and a take-up reel.

3. A device according to claim 1, wherein the means for depositing a thin film of liquid is placed between the delivering reel and the take-up reel.

4. A device for manufacturing a sensitive element having a permanent electric polarization comprising a tight enclosure containing a plastic element wound on a delivering reel and intermittently communicating with a pumping system for providing a rarefied atmosphere within the enclosure, means for imparting to the element a permanent electric polarization, a take-up reel and a system for driving the element from the delivering reel in front of the polarization means and then to the take-up reel, means for depositing on the polarized element a thin film of lubricating liquid of very low saturated vapor pressure whose dielectric strength is higher than that of rarefied air, said liquid being contained in a vessel that is within the enclosure and that is provided with means for heating the liquid therein and a roller for pressing the element against the take-up reel, said roller being placed in the vicinity of the point where the element comes in contact with the take-up reel.

5. A device according to claim 3, wherein said means for depositing a thin film of liquid on the element comprise a pad and means for feeding said pad with lubricating liquid.

6. A device according to claim 5, wherein the means for feeding the pad comprises duct means communicating with said vessel.

7. A device according to claim 5, wherein the means for feeding the pad comprises a wick.

8. A device according to claim 3, wherein said means for depositing a thin film of liquid on the element comprises an assembly of intercontacting rollers, one of said rollers being dipped in the lubricating liquid of the vessel, another one being in contact with said polarized element.

9. A device for manufacturing a sensitive element having a permanent electric polarization comprising a tight enclosure that contains a plastic element wound on a delivering reel and that intermittently communicates with a pumping system for providing a rarefied atmosphere within the enclosure, means for imparting to the element a permanent electric polarization, a take-up reel and a system for driving the element from the delivering reel in front of the polarization means and then to the take-up reel, means for depositing on the polarized element a thin film of lubricating liquid of very low saturated vapor pressure whose dielectric strength is higher than that of rarefied air, the liquid being contained in a vessel that is within the enclosure and that is provided with means for heating the liquid therein, and the take-up reel being immersed at least partly in the the lubricating liquid contained in said vessel.

* * * * *